United States Patent [19]

Minnick

[11] Patent Number: 5,110,668
[45] Date of Patent: May 5, 1992

[54] FLEXIBLE LAMINATE HAVING COPOLYETHERESTER ADHESIVE

[75] Inventor: Michael G. Minnick, Coshocton, Ohio

[73] Assignee: General Electric Company, Worthington, Ohio

[21] Appl. No.: 632,310

[22] Filed: Dec. 21, 1990

[51] Int. Cl.$^5$ .................................. B32B 7/00
[52] U.S. Cl. ........................ 428/215; 428/246; 428/285; 428/290; 428/291; 428/265; 428/267; 428/294; 428/458; 156/327; 156/332
[58] Field of Search ............... 428/290, 285, 291, 294, 428/215, 265, 267, 268, 246, 458; 156/327, 332

[56] References Cited

U.S. PATENT DOCUMENTS

| | | | |
|---|---|---|---|
| 3,023,192 | 2/1962 | Shivers, Jr. | 528/300 |
| 3,274,159 | 9/1966 | Kluiber | 260/75 |
| 3,651,014 | 3/1972 | Witsiepe | 528/301 |
| 3,763,109 | 10/1973 | Witsiepe | 528/301 |
| 3,766,146 | 10/1973 | Witsiepe | 528/301 |
| 3,784,520 | 1/1974 | Hoeschele | 528/301 |
| 3,801,547 | 4/1974 | Hoeschele | 528/301 |
| 3,907,926 | 9/1975 | Brown et al. | 260/860 |
| 4,156,774 | 5/1979 | Buxbaum et al. | 528/273 |
| 4,264,761 | 4/1981 | McGirk | 528/300 |
| 4,331,453 | 5/1982 | Dau et al. | 51/298 |
| 4,355,155 | 10/1982 | Nelsen | 528/301 |
| 4,370,191 | 1/1983 | Uekita et al. | 428/458 |
| 4,370,386 | 1/1983 | Uekita et al. | 428/458 |
| 4,371,692 | 2/1983 | Wolfe, Jr. | 528/289 |
| 4,371,693 | 2/1983 | Wolfe, Jr. | 528/292 |
| 4,396,657 | 8/1983 | Ibrahim | 428/36 |
| 4,469,851 | 9/1984 | Charles et al. | 524/539 |
| 4,477,513 | 10/1984 | Koga | 428/458 |
| 4,543,292 | 9/1985 | Giles, Jr. et al. | 428/412 |
| 4,552,950 | 11/1985 | McCready | 528/292 |
| 4,556,688 | 12/1985 | McCready et al. | 525/33 |
| 4,562,232 | 12/1985 | Smith | 525/444.5 |
| 4,569,973 | 2/1986 | Tyrell et al. | 525/437 |
| 4,579,884 | 4/1986 | Liu | 523/216 |
| 4,587,161 | 5/1986 | Barrell et al. | 428/458 |
| 4,711,933 | 12/1987 | McCready et al. | 525/415 |
| 4,714,754 | 12/1987 | McCready et al. | 528/288 |
| 4,714,755 | 12/1987 | McCready et al. | 528/288 |
| 4,735,999 | 4/1988 | Patterson et al. | 525/431 |
| 4,760,112 | 7/1988 | McCready et al. | 525/33 |
| 4,795,790 | 1/1989 | McCready et al. | 525/437 |
| 4,808,465 | 2/1989 | Vane | 428/458 |
| 4,868,033 | 9/1989 | Nakano et al. | 428/201 |
| 4,883,708 | 11/1989 | Kariya et al. | 428/263 |
| 4,891,397 | 1/1990 | Liu | 524/141 |
| 4,929,716 | 5/1990 | Tyrell et al. | 528/353 |

OTHER PUBLICATIONS

Giles, Jr. et al., Ser. No. 07/459,908 filed Jan. 2, 1990, "Polyamide Fiber Reinforced Polyetherester Composition".

Honore et al., European Polymer Journal, vol. 16, pp. 909-916, (1979) "Synthesis and Story of Various Reactive Oligomers and Poly(ester-imide-ether)s".

Primary Examiner—George F. Lesmes
Assistant Examiner—Beverly A. Pawlikowski
Attorney, Agent, or Firm—Gary L. Loser

[57] ABSTRACT

A flexible laminate comprising metal and fabric having an adhesive copolyetherester resin in the form of a film between the metal and the fabric. In a preferred embodiment, a copolyetherester resin in the form of a film is used as an adhesive for a flexible laminate made of copper foil and flexible fabric made of aromatic polyamide resin fibers. Encapsulant film may be applied to the outer surface of the fabric to enhance moisture resistance of the laminate and/or to improve the handling of the laminate.

28 Claims, 1 Drawing Sheet

FLEXIBLE LAMINATE HAVING COPOLYETHERESTER ADHESIVE

BACKGROUND OF THE INVENTION

The present invention relates to flexible laminates, and more particularly, to flexible laminates of metal adhered to fabrics.

High strength flexible fabrics are well-known in the art and include fabrics made of, for example, aromatic polyamide fibers and the like. The aromatic polyamide fibers have been made into various forms including fiber bundles, fiber mats and woven and non-woven fabric or cloth. One well-known commercially available woven polyamide aramid fiber is KEVLAR ®. Thermoplastic copolyetherester elastomers are also well-known in the art and have been used as molding compounds. Several commercially-available copolyetheresters are available, e.g., certain HYTREL ® resins and certain LOMOD- ®resins.

In U.S. Patent Application Ser. No. 459,908 filed Jan. 2, 1990 now abandoned, and assigned to the instant assignee, compositions are described which contain polyetherester resin reinforced with aromatic polyamide fibers. In U.S. Pat. Application Ser. No. 459,908, which is incorporated herein by reference in its entirety, good adhesion is exhibited between the polyetherester resin and the aromatic polyamide fibers. In certain embodiments therein, composite structures having layers of plain weave KEVLAR ® fabric of aromatic polyamide fibers and layers of polyetherester film are described.

Metal foils, including, for example foils of copper, aluminum, stainless steel and the like are also well-known in the art and are commercially available. Such metal foils have been used as substrates for making sanding belts, sanding discs, electronic components and the like.

Prior art laminates are described in U.S. Pat. Nos. 4,868,033 and 4,883,708, both of which are incorporated by reference herein in their entirety. Abrasive belts and discs having polyurethane binders and woven backings are described in U.S. Pat. No. 4,331,453, which is incorporated by reference herein in its entirety.

Prior art laminates have also been made by using thermoset resins, such as epoxy resins, to impregnate a woven cloth made from glass or organic polymer fiber rovings, such as polyaramid, to bond metals, such as copper, to cloth made from glass or organic polymer fiber. However, such laminates generally have poor adhesive integrity and either fail to adhere to the cloth or the metal or both when used as substrate for abrasive elements, for example sanding belts, discs and the like, or semiconductor substrates. Thus, it is desirable to improve the integrity of the adhesives used for bonding or adhering metal foils to cloth or fabric substrates, especially when laminates made therefrom are subjected to conditions requiring repeated flexing.

SUMMARY OF THE INVENTION

It has been discovered that flexible metal clad fabric or cloth laminates are improved by using copolyetherester resin film to adhere the metal cladding to the fabric or cloth substrate or backing. In accordance with the present invention there is provided a flexible laminate comprising metal, a copolyetherester resin film and fabric. It has been found that copolyetherester resin, in film form only, is an excellent bonding agent or adhesive for flexible laminates made from a metal, e.g., metal foil and flexible fabric. Thus, in accordance with the present invention copolyetherester resin is used as an adhesive in a flexible laminate of metal and fabric comprising a copolyetherester resin in the form of a film between a surface of the metal and surface of the fabric.

A particularly advantageous flexible laminate has been made from metal foil and fabric when the copolyetherester adhesive is a random copolyetherester derived from the reaction products of butanediol, dimethylterephthalic acid, hexanediol and poly(tetramethylene ether)glycol.

In accordance with the present invention, it has been found that the copolyetheresters, in film form only, combine excellent adhesive properties to both metal foil, such as copper, and to flexible cloth or fabric, such as polyaramid woven cloth, with excellent mechanical flexibility at room temperature. Such properties are desirable in forming substrates for mechanically flexible and tough metal (for example, copper) clad laminates useful in such industrial applications as sanding belts.

In accordance with the present invention, it has also been found that, in certain embodiments, it is advantageous to use a thermoplastic encapsulant film on the surface of the flexible fabric. Any film which will adhere to the surface of the flexible fabric and prevent the penetration of moisture into the laminate without reducing the flexiblity of the laminate, may be used in the flexible laminate of the present invention. Thus, in accordance with the present invention the laminate may comprise, in sequence, metal foil, a copolyetherester resin film, flexible fabric and thermoplastic encapsulant film.

The laminates or composites of the present invention have excellent flexibility and can withstand the rigorous flexing required of sanding belts without delamination.

BRIEF DESCRIPTION OF THE DRAWINGS

Various features and advantages of the invention can be best understood from the following description taken in conjunction with the accompanying drawings in which.

DETAILED DESCRIPTION OF THE INVENTION

Figure 1:
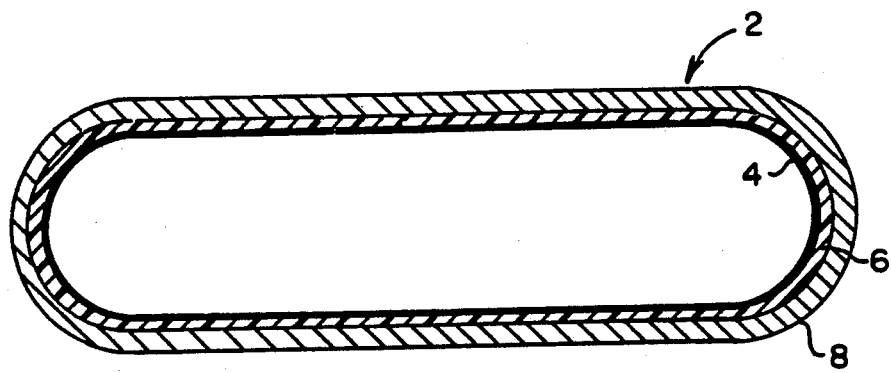
FIG. 1 is a side elevational view of a flexible metal clad fabric laminate belt in accordance with the present invention.

The compositions of the present invention are in the form of flexible composites or laminates comprising, in sequence, metallic foil, thermoplastic copolyetherester resin film, fabric and optionally a thermoplastic encapsulant film. Critical in the laminates of the present invention is the use of a film of thermoplastic copolyetherester resin as an adhesive for the metal foil and the fabric.

Thermoplastic copolyetherester resins are well-known and have enjoyed continued and increasing commercial successes. They are described in U.S. Pat. Nos. 3,023,192; 3,651,014; 3,763,109; 3,766,146; 3,784,520; 3,801,547; 4,156,774, 4,264,761 and 4,355,155, among others, all incorporated herein by reference. In accordance with the present invention, it is necessary that the films formed from these compositions be flexible, yet that they have the ability to maintain their structural integrity while being subjected to rigorous flexing, such as that required in a belt configuration moving at high speeds, for example, 500 revolutions or higher per minute.

Suitable thermoplastic copolyetherester resins include both random and block copolymers. In general these are prepared by conventional esterification/polycondensation processes from (a) one or more diols, (b) one or more dicarboxylic acids, (c) one or more long chain ether glycols, and optionally, (d) one or more caprolactones or polycaprolactones.

Diols(a) which can be used in the preparation of the copolyetherester resins include both saturated and unsaturated aliphatic and cycloaliphatic dihydroxy compounds as well as aromatic dihydroxy compounds. These diols are preferably of a low molecular weight, i.e. having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4- dihydroxy cyclohexane; 1,2-, 1,3- and 1,4- cyclohexane dimethanol; butenediol; hexenediol, etc. Especially preferred in the copolyetherester resin films of the present invention are 1,4-butanediol and mixtures thereof with hexanediol.

Aromatic diols suitable for use in the preparation of the thermoplastic elastomers are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl)propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, most preferably at least about 80 mole %, based on the total diol content, be the same diol. As mentioned above, the preferred thermoplastic elastomers are those in which 1,4-butanediol is present in a predominant amount.

Dicarboxylic acids (b) which are suitable for use in the preparation of the copolyetherester resins include aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reactions with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as -O-or -SO$_2$-.

Representative aliphatic and cycloaliphatic acids which can be used are sebacic acid, 1,2-cyclohexane dicarboxylic acid, 1,3-cyclohexane dicarboxylic acid, 1-4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylene-bis (cyclohexane carboxylic acid), 3,4-furan dicarboxylic acid, and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benezene nuclei such as bis(p-carboxyphenyl) methane, oxybis(benzoic acid), ethylene-1,2-bis-(p-oxybenzoic acid), 1,5-naphthalene dicarboxylic acid, 2,6-naphthalene dicarboxylic acid, 2,7-napthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p($\alpha$-hydroxyethoxy)benzoic acid can also be used provided an aromatic dicarboxylic acid is also present.

Where mixtures of dicarboxylic acids are employed, it is preferred that at least about 60 mole %, preferably at least about 80 mole %, based on 100 mole % of dicarboxylic acid (b) be of the same dicarboxylic acid or ester derivative thereof. As mentioned above, the preferred copolyetherester resin films are those in which dimethylterephthalate is the predominant dicarboxylic acid.

Suitable long chain ether glycols (c) which can be used in the preparation of the thermoplastic copolyetherester resins are preferably poly(oxyalkylene)glycols and copoly(oxyalkylene)glycols of molecular weight of from about 400 to 1200. Preferred poly(oxyalkylene) units are derived from long chain ether glycols of from about 900 to about 4000 molecular weight and having a carbon-to-oxygen ratio of from about 1.8 to about 4.3, exclusive of any side chains.

Representative of suitable poly(oxyalkylene)glycols there may be given poly(ethylene ether)glycol; poly(propylene ether)glycol; poly(tetramethylene ether)glycol; random or block copolymers of ethylene oxide and propylene oxide, including ethylene oxide end capped poly(propylene ether)glycol and predominantly poly(ethylene ether) backbone, copoly(propylene ether-ethylene ether)glycol; and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene)glycols are poly(propylene ether)glycol, poly(tetramethylene ether)glycol and predominantly poly(ethylene ether) backbone copoly(propylene ether-ethylene ether)glycol. The most preferred poly(oxyalkylene)glycol for the copolyetherester resin films of the present invention is poly(tetramethylene ether)glycol.

Optionally, the copolyetheresters resins may have incorporated therein one or more caprolactones or polycaprolactones.

Caprolactones (d) suitable for use herein are widely available commercially, e.g., Union Carbide Corporation and Aldrich Chemicals. While epsilon caprolactone is especially preferred, it is also possible to use substituted caprolactones wherein the epsilon caprolactone is substituted by a lower alkyl group such as a methyl or ethyl group at the alpha, beta, gamma, delta or epsilon positions. Additionally, it is possible to use polycaprolactone, including homopolymers and copolymers thereof with one or more components, as well as hydroxy terminated polycaprolactone, as block units in the copolyetherester resins of the present invention. Suitable polycaprolactones and processes for their production are described in, for example, U.S. Pat. Nos. 3,761,511; 3,767,627, and 3,806,495 herein incorporated by reference.

In general, suitable copolyetherester resin elastomers are those in which the weight percent of (c) long chain ether glycol component or the combined weight percent of (c) long chain ether glycol component and (d) caprolactone component in the copolyetherester is from about 5 to about 70 weight percent. Preferred compositions are those wherein the weight percent of (c) or (c) and (d) is from about 10 to about 60 weight percent. Where both (c) long chain ether glycol and (d) caprolactone are present, each will comprise from about 2 to about 50 percent by weight, preferably from about 5 to about 30 percent by weight, of the copolyetherester.

As described above, the copolyetherester resin may be prepared by conventional esterification/condensation reactions for the production of polyesters, and they must be capable of forming a film. Exemplary of the processes that may be practiced are as set forth in, for example, U.S. Pat. Nos. 3,023,192; 3,763,109; 3,651,014; and 3,801,547, herein incorporated by reference. Additionally, these compositions may be prepared by such processes and other known processes to effect random copolymers, block copolymers or hybrids thereof wherein both random and block units are present. For example, it is possible that any two or more of the foregoing monomers/reactants may be prereacted prior to polymerization of the final copolyetherester resins. Alternatively, a two part synthesis may be employed wherein two different diols and/or dicarboxylic acids are each prereacted in separated reactors to form two low molecular weight prepolymers which are then combined with the long chain ether glycol to form the final tri-block copolyetherester resin. Further exemplification of various copolyetherester resins will be set forth below in examples.

The copolyetherester resins used in the films of the present invention may be blended with, for example, from about 1% to about 50% by weight of a second thermoplastic polymer as long as the second thermoplastic polymer does not interfere with the film-forming and adhesive properties of the copolyetherester resin. For example, polybutylene terephthalate resin may be employed at a level of about 35% by weight based on the total combined weight of copolyetherester resin and polybutylene terephthalate.

The thermoplastic polyetherester resin films used to adhere flexible fabric to metallic substrate in accordance with the present invention do not include polyetheresterimides, such as those described in Wolfe, Jr., U.S. Pat. No. 4,371,692; Wolfe, Jr., U.S. Pat. No. 4,371,693; Kluiber, et al., U.S. Pat. No. 3,274,159; McCready, U.S. Pat. No. 4,552,950 all of which are incorporated herein by reference, and Honore, et al., "Synthesis and Study of Various Reactive Oligomers and of Poly(ester-imide-ether)s, European Polymer Journal," Vol. 16, pp. 909–916, Oct. 12, 1979. However, such polyetheresterimide films as discussed in more detail below, can be used as the encapsulant, moisture-impermeable film on the non-adhering surface of the fabric.

The preferred copolyetherester resin films of the present invention have an ether glycol (c), i.e., polyether, content of about 10% to about 60% by weight, based on the total weight of the composition, and more preferably, the copolyetherester resin films have about 30% to about 40% by weight ether glycol (c), i.e., polyether, content based on the total weight of the composition. However, generally, it is only necessary to provide a copolyetherester resin film having an effective amount of ether glycol (c), i.e., polyether, content therein, that is, an amount which, in combination with the diol (a), dicarboxylic acid (b) and optionally caprolactone (d), produces a film which causes the adhesion of a metal and a fabric to form a flexible laminate.

The preferred copolyetherester resins for making the films of the present invention, said films being adhesive to metal and to fabric upon application of heat thereto and form an excellent adhesive bond to the metal and the fabric upon cooling to ambient temperature, contain about 90% by weight to about 40% by weight of (a) and (b) combined, (a) being the diol and (b) being the dicarboxylic acid; and about 10% by weight to about 60% by weight of (c), (c) being the ether glycol, and more preferably, about 70% by weight to about 60% by weight of (a) and (b) combined and about 30% by weight to about 40% by weight (c), % by weight being based on the total weight of the composition. In the preferred embodiment the diol(s) (a) and the dicarboxylic acid (b) are generally present in equimolar quantities, that is, the diol(s) (a) is about 50 mole % and the dicarboxylic acid (b) is about 50 mole % of (a) and (b) combined. As discussed above, in preferred embodiments two different diols (a) one of which is predominant, are used to prepare the copolyetherester films which are useful to bond metal to fabric in accordance with the present invention. In the most preferred embodiment of the present invention, the copolyetherester resin film has a flexural modulus of about $10K_{psi}$ is the reaction product of about 67% by weight of dimethylterephthalic acid (b), hexanediol (a) and butanediol (a) and about 33% by weight of poly(tetramethylene ether) glycol (c), wherein dimethylterephthalic acid (b) is about 33% by weight and the butanediol (a) and hexanediol (a) are about 4% by weight of the total composition, the butanediol (a) being the predominant diol (a), i.e., at least about 60 mole % and more preferably at least about 80 mole % of the two diols being butanediol (a).

The thickness of the copolyetherester resin film is not critical in the practice of the present invention as long as there is an effective amount of the film after softening or hot melt processing in the laminate or composite to adhere a metal, such as a copper foil, to a fabric, such as KEVLAR ® made from polyaramid fibers. In certain embodiments of the present invention, the thickness of the film of copolyetherester resin is about 0.5 mil to about 50 mils, and in more preferred embodiments the thickness of the film is about 5 mils to about 10 mils. In certain instances, it may be desirable to use greater amounts (thicknesses) of copolyetherester resin film as an adhesive if it is desired to infiltrate the fabric with copolyetherester resin. This can be achieved during the lamination step by applying an effective amount of heat to the adhesive layer to cause a portion of the softened or hot melt copolyetherester resin adhesive to penetrate into the fibers of the fabric. This can be easily achieved by one skilled in the art while the adhesive bond of the metal and fabric is being formed with the copolyetherester resin film. The amount or thickness of the copolyetherester resin film is not critical as long as the flexiblity of the laminate or composite is maintained.

The film of copolyetherester resin may be applied in the form of a pre-formed sheet, preferably continuous, i.e., without holes or cracks, or the a film of the copolyetherester resin may be cast on either or both surfaces prior to formation of the composite, i.e., prior to lamination. Thus, the film may be cast on the surface of the metal to be adhered to the fabric and/or it may be cast on the surface of the fabric to be adhered to the metal. The film may be cast by conventional methods on the fabric surface or on the metal surface, or both, from a solvent solution or from a medium in which the copolyetherester resin is partly soluble and partly suspended. It is not necessary that the copolyetherester resin be completely soluble in the solvent as long as a film of the copolyetherester resin can be cast on the surface of the metal and/or the surface of the fabric. The method of casting the film is not critical as long as a film, preferably continuous, of the copolyetherester resin is formed on the surface(s). Naturally, it is within the purview of one skilled in the art to use more than one layer of copolyetherester resin film between the metal and the fabric in the laminates or composites of the present invention.

In certain preferred embodiments of the present invention, the copolyetherester resin film is prepared by placing a layer of chips of copolyetherester resin, e.g., in the form of 9 inch discs of about 12 mil to about 15 mil thickness, between the metal and the foil. Upon application of pressure and heat, the chips soften and form a uniform, continuous adhesive film between the metal and the fabric.

The high strength flexible fabric used in the laminates of the present invention may be any of the conventional high strength flexible fabrics known in the art, i.e., those which have been found useful in making flexible laminates for sanding belts, sanding discs, electronic components and the like. They include cloth fabrics, both woven and non-woven, made of aromatic polyamide resin fibers, including nylon fibers, e.g., NOMEX ®, and polyaramid fibers, e.g., KEVLAR ®; polyethylene terephthalate fibers and the like, and mixtures thereof. Reference may be made to U.S. Pat. Nos. 4,735,999 and 4,883,708 which are incorporated herein by reference in their entirety, for teachings of various aromatic amide materials. Naturally, other high strength fibrous materials may be mixed with the fibrous materials used in the laminates of the present invention as long as they do not compromise the strength of the laminate or interfere with the flexibility of the laminates.

The aromatic polyamide materials, otherwise defined herein as aromatic polyamide resin or polyaramid fibers, and fabrics (cloth) made therefrom, useful in this invention are generally derived from an aromatic diacid such as terephthalic acid, isophthalic acid, phthalic acid, naphthalene diacid, and the like and aromatic diamines such as metaphenylenediamine, paraphenylenediamine, 1,6-naphthalenediamine, and the like. Aromatic amide polymers which are useful in this invention, are prepared and sold commercially by DuPont under the trademark KEVLAR ® resin and NOMEX ® resin. KEVLAR ® is the monomeric repeating units of terephthalic acid and 1,4-phenylenediamine and is the condensation product of terephthaloyl chloride and para-phenylene diamine. The form of the aromatic amide polymer can be any form which reinforces the metal substrate used in the laminates of the present invention while remaining flexible. These forms include fabrics, both woven and non-woven fibers, mats, whiskers, and any other form which is capable of reinforcing the metal substrate, e.g., metal foil.

The quantity of the flexible fabric present in the laminate or composite of the present invention is not critical as long as there is an effective amount to reinforce the metallic substrate in the laminate. These quantities are well-known by those skilled in the art.

The flexible fabric reinforcing material can be incorporated in the laminate in any of the known methods. The reinforcing material can be in mat form, and the copolyetherester resin film can be placed on a surface of the mat so as to make a sandwich of the mat with metallic substrate as described in more detail below. The mat can be present in a mold, and copolyetherester resin film can be cast thereon prior to the formation of the laminate with the metal substrate. The copolyetherester resin film can also be placed on a surface of the metal substrate or cast in a mold on the surface of the metal substrate prior to the formation of the laminate with the flexible fabric. In certain embodiments the fabric is about 1 mil to about 50 mils in thickness and more preferably, about 2 mils to about 15 mils in thickness.

The metal substrate used to form laminates in accordance with the present invention is not critical. Preferred metal substrates are metal foils, that is, metal sheets having a thickness of about 0.1 mil to about 10 mils and more preferably from about 0.5 mil to about 5 mils. Metal substrates of the present invention include metals and metal alloys, e.g., copper, aluminum, stainless steel, and the like. Copper foil having a thickness of about 1.4 mils is preferred for sanding belt metal substrates, however, aluminum foil and stainless steel foil can also be used as metal substrates for sanding belts.

In order to maintain flexibility and flex fatigue in the laminates or composites of the present invention, all of the layers of the laminate, i.e., the metal, the copolyetherester adhesive film and the fabric must be flexible individually and in combination. Flexibility, as used herein, varies according to the particular end use of the particular laminate or composite. Generally, as used herein, a laminate that has flexibility or a flexible laminate is one which is capable of bending in response to pressure applied thereto, and one skilled in the art can easily determine the degree of bending or flexibility required for a particular use.

A practical test for flexibility and flexural fatigue resistance is to fold the laminate and pinch the folded edge to form a crease. The number of times this fold can be reversed without inducing a tear in the fabric is indicative of the flexural fatigue. Generally, prior art epoxy materials promote good adhesion to copper and Kevlar ®, but result in poor flexibility and/or flex fatigue. Other thermoplastic elastomers, i.e., other than the copolyetherester resin films of the present invention, promote good flexibility and flex fatigue in laminates, but result in laminates having poor copper adhesion. For example, when the laminate or composite of the present invention is used as a sanding belt substrate, the laminate must be capable of passing over and in contact with two movable parallel rollers spaced from each other with their ends in registry, the non-adhesive metal surface of the laminate, i.e., the surface of the metal opposite the surface adhered to the fabric, being in contact with the surface of the rollers. Flex testing of such sanding belts is described in U.S. Pat. No. 4,331,453 which is incorporated by reference herein in its entirely. Naturally, the laminates of the present invention, when used for sanding belts or any other use, must resist delamination when subjected to flexing. When the laminates of the present invention are used for substrates for flexible printed circuits and sanding discs, there is less flexing of the laminate, however, the laminate must be capable of responding to or conforming to the changing contours or pressure to which they are subjected.

In certain embodiments, the flexible laminates of the present invention further comprise, in sequence, a thermoplastic encapsulant film having a high softening temperature on the non-adhesive surface of the fabric, i.e., on the surface of the fabric opposite the surface thereof adhered to the metal. Thus, the sequence of the layers in the laminate comprises metal substrate, copolyetherester resin include polyetheresterimide films, e.g., ULTEM ® by General Electric Company, KAPTON ® by E.I. duPont and poly(butylene terephthalate), e.g., VALOX ® by General Electric Company.

Any encapsulant film having a high softening temperature may be applied to the fabric as long as the flexible fabric adheres to it, and as long as it acts as a moisture barrier, i.e., it prevents the passage of moisture or water from the atmosphere into the flexible fabric. Thus, the encapsulant film must be water-impermeable. By high softening temperature is meant that the encapsulant film must not soften and flow into the fabric at the temperatures required to soften the copolyetherester resin film when the laminate is heated to adhere the metal to the fabric. One skilled in the art can easily determine the differential required between the softening temperature of the encapsulant film and the softening temperature of the copolyetherester resin film having the lower softening temperature. For example, if the temperature required to soften the copolyetherester resin film and thereby cause it to adhere to the metal and the fabric is about 160-200 C., then the softening temperature of the encapsulant film must be higher than 220° C., preferably about 225° C. to about 230° C. or higher. The encapsulant film which softens at a higher temperature than the adhesive copolyetherester resin film, may be applied to the surface of the fabric prior to lamination in order to apply heat at a sufficient temperature to cause the encapsulant film to adhere to the fabric. This can be easily achieved by pressing and heating at the softening temperature of the encapsulant film. However, in more preferred embodiments, during lamination when the fabric and metal substrate are adhered to each other by heating the copolyetherester resin film at its softening temperature, copolyetherester resin also flows into and through the fabric and wets or spreads upon the surface of the encapsulant film which is in contact with the fabric. Upon cooling, not only do the metal and fabric adhere to each other, but also the encapsulant film and fabric adhere to each other.

In certain embodiments, it is necessary to prevent the passage of moisture through the flexible fabric where it promotes the failure of the adhesive properties of the copolyetherester resin film which bonds the flexible fabric to the metallic substrate. Furthermore, in certain instances, it is advantageous to press two laminates or composites back-to-back, i.e. a flexible laminate having, in sequence, metal substrate, copolyetherester resin film and fabric pressed adjacent a flexible laminate having, in sequence, fabric, copolyetherester resin film and metal substrate. The copolyetherester resin film has a tendency to flow through the flexible fabric, and the two separate laminates or composites adhere to each other during pressing and heating. Upon separation of the two separate laminates after they have been heated and subsequently cooled, the copolyetherester resin film would separate from the back of the flexible fabric leaving it exposed. Furthermore, stresses induced as a result of the differences in the coefficient of thermal expansion (CTE) of the metal foil and impregnated fabric layer would cause the unrestrained laminate to coil. Laminating back-to-back offsets these induced stresses and keeps the laminates flat for further processing. In order to overcome the foregoing problems, the encapsulant film is used on the outer surface of the flexible fabric, that is, on the side of the flexible fabric opposite the side having the adhesive copolyetherester resin film thereon. The encapsulant film deposited thereon serves not only as a release film, enabling the separation of laminates prepared back-to-back following processing, but also as a moisture barrier for improved moisture resistance of the laminate.

The thickness of the encapsulant film is not critical as long as the laminate retains its flexibility and as long as there is an effective amount of encapsulant film to act as a moisture barrier and release layer. Generally, about 0.5 mil to about 5 mils of encapsulant film is used, and more preferably, about 1 mil to about 2 mils of encapsulant film is used on the laminates of the present invention. In the most preferred embodiment, about 1 mil thickness of polyetheresterimide is used as the encapsulant film or a poly(butylene terephthalate) film having a thickness of about 2 mils is used as the encapsulant film.

These encapsulant films are well-known in the art and need no additional description herein. The polyetheresterimides which are discussed above and incorporated herein by reference are exemplary of the polyetheresterimides which may be used as encapsulant films in accordance with the present invention. The encapsulant films are applied to the fabric by any conventional well-known pressing and heating technique.

In accordance with the present invention, it has been discovered that copolyetherester film exhibits excellent adhesion for adhering metal substrates to fabric. More specifically, it has been discovered that there is excellent adhesion between the copper cladding and polyaramid cloth in laminates of the present invention which laminates maintain excellent flexibility without delamination when they are made from copper foil and polyaramid cloth adhered by a copolyetherester resin film.

The polymers and polymer films of the present invention can contain various additives normally incorporated in copolyetherester resins and the other thermoplastic resins used herein as long as they do not have any adverse effect on the adhesive properties of the film or the flexibility of the laminate. For example, antioxidants as well as other stabilizers including thermal and UV stabilizers as discussed and disclosed in U.S. Pat. No. 4,929,716 which is incorporated by reference herein in its entirety, may be used in the laminates or composites of the present invention, as well as flame retardants, pigments, dyes, fillers and the like.

Various laminate articles and structures which may be made from the laminates of the present invention are shown in FIGS. 1-5. Articles made from the laminates of the present invention include sanding belt substrates, sanding disc substrates, for electronic components, e.g. flexible printed circuit boards, and the like.

In FIG. 1, there is shown a sanding belt substrate similar to that shown and described in U.S. Pat. No. 4,331,453 which is incorporated herein by reference in its entirety. The sanding belt of FIG. 1 utilizes the flexible laminate of the present invention. In FIG. 1, sanding belt 2 comprises flexible metal substrate 4, e.g., copper foil, as the inner layer of the laminate. Flexible metal substrate 4 is adhered to flexible fabric 8, e.g. fabric made from aromatic polyamide resin fibers, with copolyetherester resin film 6, e.g. a random copolyetherester derived from the reaction products of butanediol, dimethylterephthalic acid, hexanediol and poly(tetramethylene ether)glycol. It is the inner surface of metal substrate 4, i.e., the surface of metal substrate 4 which is opposite copolyetherester resin film 6, which contacts the spaced parallel rollers (not shown) of a conventional sanding machine. Although it is not shown in FIG. 1, a layer or layers of conventional abrasives are applied to the outer surface of fabric 8 by conventional techniques. The outer surface of fabric 8 is that surface of fabric 8 which is opposite the surface of fabric 8 in contact with adhesive resin layer 6.

Figure 2:
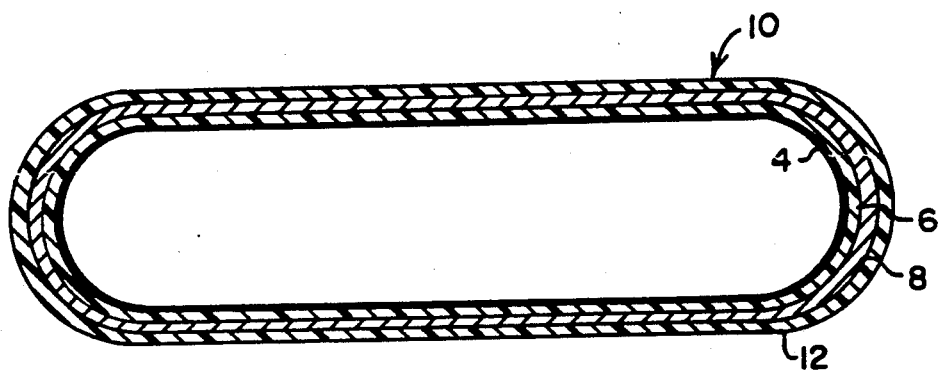
FIG. 2 is a side elevational view of an alternative flexible metal clad fabric laminate belt in accordance with the present invention.

In another embodiment of Applicant's invention illustrated in FIG. 2, sanding belt 10 comprises flexible metal substrate 4 adhered to flexible fabric 8 by copolyetherester resin film 6 and further having encapsulant film 12 adhered to flexible fabric 8. Encapsulant film 12 is preferably adhered to flexible fabric 8 by copolyetherester elastomer film 6 which flows or passes through flexible fabric 8 when the laminate is made by applying heat and pressure thereto, the heat causing the flow of the copolyetherester 25 resin film 6 through flexible fabric 8. Encapsulant film 12, for example, is a film of polyetheresterimide of about 1.0 mil thickness or a poly(butylene terephthalate) film having a thickness of about 2.0 mils. Encapsulant film 12 has a higher softening temperature than resin 6 so that heat applied during the lamination of belt 10 will not soften film 12 and thereby compromise its integrity or the ability to maintain imperameability to moisture. Although it is not shown in FIG. 2, a layer or layers of conventional abrasives are applied to the outer surface of encapsulant film 12 by conventional techniques. The outer surface of film 12 is that surface of film 12 which is opposite the surface of fabric 8.

Figure 3:
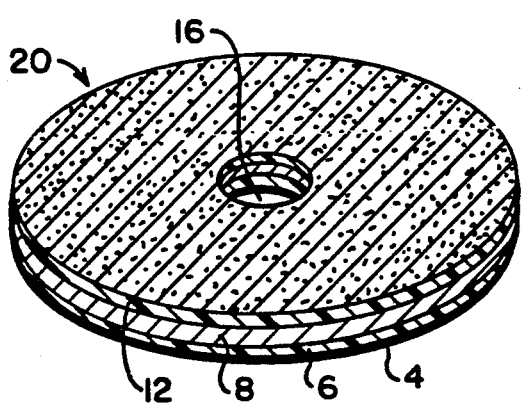
FIG. 3 is a perspective view of a flexible metal clad fabric laminate disc in accordance with the present invention.

FIG. 3 illustrates a flexible sanding disc 20 which may be made from the flexible laminate of the present invention. The sequence of the layers of the laminate, i.e., layers 4, 6, 8 and 12, correspond to the respective layers identified by the same numerals discussed above for the laminate of FIG. 2. Centrally-located opening 16 is shown in sanding disc 20 and is used to facilitate mounting of disc 20 on a conventional disc sanding machine pad as well-known in the art. Conventional abrasive (now shown) is bonded to the outer surface of layer 12.

Figure 4:
FIG. 4 is a side elevational view of an enlarged section of flexible metal clad laminate in accordance with the present invention.
Figure 5:
FIG. 5 is a side elevational view of an enlarged section of an alternative flexible metal clad laminate in accordance with the present invention.

FIGS. 4 and 5 show enlarged sections of flexible laminate of the present invention wherein numerals shown therein correspond to the numerals used to define the layers of FIGS. 1, 2 or 3, the numerals of FIG. 4 corresponding to those of FIG. 1 and the numerals of FIG. 5 corresponding to those of FIGS. 2 and 3.

Although none of the drawings shown in FIGS. 1-5 are drawn to scale, in various embodiments of the present invention, layer 4 (metal substrate) is generally about 0.1 to about 10 mils in thickness, layer 6 (copolyetherester resin film) is generally about 0.5 to about 20 mils in thickness; layer 8 (flexible fabric) is about 1 mil to about 20 mils in thickness; and layer 12 (encapsulant film) in those embodiments having such a layer, is about 0.5 mil to about 5 mils in thickness.

The composites of the present invention are preferably in the form of a laminate made by melt laminating one or more layers of copolyetherester resin film with a layer of flexible fabric and a layer of metal substrate, e.g., metal foil. Any conventional process and technique may be used to form the laminates of the present invention. The respective layers are deposited in the sequence as shown and described in FIGS. 1-5 above and are subjected to temperatures which soften or melt the copolyetherester resin film while pressure is applied to uniformly seat the layers in such a manner that the respective layers contact each other while the copolyetherester resin film is in a softened or melted state. Temperatures vary according to the softening and/or melting temperature of the particular copolyetherester resin film, and the temperature may be any temperature which will cause the softening or melting of the copolyetherester resin film without softening or melting the flexible fabric, without softening or melting the optional encapsulant film, and without causing decomposition of the copolyetherester resin film. All such techniques are well-known in the art. The flexible laminate of the present invention may be pressed in a mold or on a suitable platen or any other surface to which the laminate is to conform for its final configuration.

The application of pressure is not critical but it is preferred to minimize temperature requirements to permit the polyether ester resin to penetrate through the fabric and adhesively bond to metal foil and encapsulant film. In preferred embodiments of the present invention, pressure is applied to the laminate at 100-1000 psi at a temperature of about 160° C. to about 220° C. for about 20-40 minutes. Thereafter, the laminate was cooled to room temperature; and the laminate or composite was removed from the press. The thermal energy necessary to soften the copolyetherester film may be applied to the laminate from the platen(s) of the press or from any other suitable conventional source. Heat is applied only at a temperature for a sufficient amount of time to soften the copolyetherester resin film so that it will adhere to the fabric, the metal and optionally pass through the fabric and contact or wet the surface of the encapsulant film. Although there is no upper limit to the length of time that heat is applied to the laminate, softening of the adhesive film during lamination generally requires the application of heat for about 2 to about 30 minutes. The temperature is that temperature required to soften the film of copolyetherester resin, generally, about 100° C. to about 300° C., and in most cases about 160° C. to about 220° C.

EXAMPLES

The following examples illustrate the present invention but are not meant to limit the scope thereof.

EXAMPLE 1

A copolyetherester film, available under the trademark LOMOD ® B, made by the well-known condensation reaction of 1,4-dimethylterephthalic acid, 1,4-butanediol and 1,6-hexanediol, the content of the foregoing being about 67% by weight of the total weight of the copolyetherester, and about 33% by weight alpha-hydroxy-omega-hydroxy-poly(oxy-1,4-butanediol) otherwise known as poly(tetramethylene ether)glycol. Thus, the polyether content was about 33% by weight and the polyester content was about 67% by weight, percent by weight being based on the total weight of the polyether and polyester. The sample had a flexural modulus of approximately 10 Kpsi.

EXAMPLE 2

A sample of copolyetheresterimide resin film containing 48% by weight polyester made by the well-known condensation reaction of 1,4-dimethylterephthalic acid and 1,4-butanediol and 52% by weight the polyetherimide, poly(oxypropylene)-bis (N-trimellitimide), the weight percent being based upon the total weight of the composition. The polyether content of the polyetheresterimide was about 52% by weight of the total composition and the flexural modulus was about 10 Kpsi.

EXAMPLE 3

A third sample of adhesive or bond coat was prepared from an epoxy resin which was impact modified and is commercially available from Dow Chemical under the designation 695 TACTIX epoxy.

Each of the foregoing samples was used to prepare copper clad polyaramid laminates. The polyaramid cloth was KEVLAR ® 710-800 cloth supplied by E.I. DuPont. The copper foil was a 1 oz. copper foil (JPC) supplied by Gould, Inc. Each sample of the foregoing adhesive materials was used to bond a sample of the 1 oz. JPC copper foil to the KEVLAR ® cloth. The pressing conditions were carried out at about 200° C. -220° C. at a pressure of about 70 p.s.i. for about 20 minutes. After pressing, the laminates were allowed to cool and tested for number of bends to tear which is the number of successive 180° bends prior to tearing by hand, and the peel strength was measured in lbs/sq.in. as the force required to peel copper from the laminate. The table below shows the results of these tests for each of the above laminates prepared with the different bond coats set forth above.

TABLE I

ADHESIVE BONDCOATS FOR COPPER FOIL/POLYARAMID FABRIC LAMINATES

| EXAMPLE | 1 | 2 | 3 |
|---|---|---|---|
| COPOLYETHERESTER FILM | X | | |
| COPOLYETHERESTERIMIDE FILM | | X | |
| MODIFIED EPOXY FILM | | | X |
| BENDS TO TEAR | *NT | *NT | 3 |
| PEEL STRENGTH (lbs./sq. in.) | >40 | 3.0 | 6.6 |

*NT = no tear after many successive bends.

It can be seen from the data in Table I that the flexible laminate using the copolyetherester film of Example 1 produces a superior adhesive bond coat for copper foil/polyaramid fabric laminates. Although the copper foil/polyaramid fabric laminates bonded with the copolyetherester imide film of Example 2 resulted in a laminate which did not tear after many successive bends, the peel strength was substantially inferior to that of the copper foil/polyaramid fabric laminate bonded with the copolyetherester film of Example 1. The laminate using the conventional epoxy film of Example 3 to bond the copper foil/polyaramid fabric had very poor bonding characteristics.

EXAMPLE 4

A copper foil/polyaramid fabric laminate was prepared by using the copolyetherester film in substantially the same manner as Example 1 above. The peel strength as pressed (dry) was measured and compared with the peel strength of the laminate after immersion in hot water (near boiling) for one hour. The results are shown in Table II below.

EXAMPLE 5

A copper foil/polyaramid fabric laminate was prepared by bonding with a copolyetherester film substantially as described in Example 1 above except an outer layer of polyetheresterimide encapsulant film having a thickness of about 1 mil was placed on the outside of the polyaramid fabric, that is, on the polyaramid fabric opposite the bond of the fabric with the copper foil and pressed as described above. The peel strength as pressed (dry) and the peel strength after immersion in hot water (near boiling) after one hour is set forth in Table II below.

TABLE II

WATER TESTS ON COPPER FOIL/POLYARAMID FABRIC BONDED WITH COPOLYETHERESTER FILM

| EXAMPLE: | 4 | 5 |
|---|---|---|
| POLYETHERESTER IMIDE ENCAPSULANT FILM | NO | YES |
| PEEL STRENGTH AS PRESSED (lbs/sq. in.) | 12.0 | 14.0 |
| PEEL STRENGTH AFTER 1 HR. IMMERSION IN HOT WATER (lbs/sq. in.) | 6.4 | 14.0 |

It can be seen from the data in Table I that the peel strength of the copper foil/polyaramid fabric bonded with copolyetherester and having a polyetheresterimide encapsulant film on the surface was substantially superior in peel strength after 1 hour of immersion in hot water when compared with the identical sample having no film on the outer surface.

EXAMPLE 6

A laminate was prepared using 5 mil thick aluminum foil face sheets, copolyetherester resin LOMOD® identified in Example 1 in the form of about 2 inches ×3 inches ×0.125 inch chip. The sample was pressed as follows in a standard heated press. The LOMOD® chip was in the form of a 9 inch disc having an approximate thickness of 12 mils.

| Press No | Pressure (p.s.i.) | Temperature (°C.) | Time (Minutes) |
|---|---|---|---|
| a. | 20 | 200 | 10 |
| b. | 50 | 190 | 2 |
| c. | 50 | 40 | *— |

*Removed from press.

The aluminum foil could not be separated from the adhesive film of copolyetherester resin formed by hot pressing the layers which resulted in the formation of a film from the copolyetherester resin chip.

EXAMPLE 7

The pressure conditions used in Example 6 were repeated using the following lay up: a 1.0 mil film of TEDLAR®, a polyvinylfluoride film supplied by E.I. duPont, 5 mil thick 1 oz JPC copper foil, 12 mil thick LOMOD® chips having the composition of Example 1, 5 mil thick KEVLAR® 710 cloth and a 1.0 mil film of TEDLAR®.

The resulting samples had excellent copper foil/KEVLAR® fabric adhesion, an excellent ability to withstand mechanical fatigue and excellent flexibility.

EXAMPLES 8-11

Laminates were prepared to compare the effectiveness of various copolyetherester and copolyetheresterimide resins as adhesives in copper clad flexible laminates made with polyaramid fabric. The pellets or film of adhesive material were pressed into KEVLAR® 700 polyaramid cloth placed between 1-ounce copper foil and a 1 mil thick ULTEM® polyetheresterimide film at 180° C. platen temperature and 300 psi for 20 to 30 minutes. The peel strength, both at room temperature and at 125° C. for a period of 10 minutes, in lbs/inch measured according to IPC test method 2.4.8, is shown in TABLE III below.

In Example 8, the adhesive is a copolyetherester film made by the condensation reaction of 1,4-dimethylterephthalic acid, 1,6-hexanediol and 1,4-butanediol as the hard block of the copolymer and about 28% by weight, based on the total weight of the composition, of poly(tetramethylene oxide) glycol as the soft block of the copolymer. The film has a flexural modulus (as measured per test ASTM 790) of about 10,000 psi. The reaction conditions for the preparation of this copolyetherester are set forth in U.S. Pat. Nos. 3,784,520 and 3,763,109.

In Example 9, the adhesive is a copolyetheresterimide made by the condensation reaction of 1,4-dimethylterephthalic acid and 1,4-butanediol as the hard block of the copolymer and about 64% by weight, based on the total weight of the composition, of polyoxyalkylene diimide diacid as the soft block of the copolymer. The copolyetheresterimide of example 9 has a flexural modulus of about 6,000 psi. The polypropylene glycol diimide acid is the imidization product of trimetallic anhydride and Texaco Chemical Company's JEFFAMINE® D2000, a polypropylene ether diamine having an average molecular weight of about 2000. The preparation of this copolyetheresterimide is described in U.S. Pat. Nos. 4,760,112 and 4,891,397 both of which are incorporated by reference herein in their entirety.

In example 10, the adhesive is a copolyetheresterimide esterimide made by the condensation reaction of 1,4-butanediol, polyoxyalkylene diimnide diacid (prepared as discussed above in Example 9), dimethylterephthalate, poly(ethylene oxide)glycol, a phenolic antioxidant and a titanium catalyst as described in U.S. Pat. No. 4,795,790 which is incorporated herein by reference in its entirety. The film has a flexural modulus of about 6,000 psi. The soft block of this polymer is a mixture of about 45% by weight polyoxyalkylene diimide diacid and about 19% by weight poly(ethylene oxide)glycol, based on the total weight of the composition.

In Example 11, the adhesive is a copolyetherester as in Example 8 except it contains about 6% by weight of poly(ethylene oxide)glycol and about 32% by weight of poly(tetramethylene oxide)glycol, based on the total weight of the composition, and it has a flexural modulus of about 6,000 psi.

TABLE III

PEEL STRENGTH OF COMPARATIVE ADHESIVES AS BONDCOATS FOR COPPER FOIL/POLYARAMID FABRIC

| | PEEL STRENGTH (LBS./IN.) | |
|---|---|---|
| Example No. | Measured at Room Temp. | Measured at 125° C., 10 min. |
| 8 | 13.0 | 0.24 |
| 9 | 2.4 | 0.32 |
| 10 | 0.6 | 0.20 |
| 11 | 7.8 | 0.68 |

It can be seen from the comparative data of Examples 8-11 that the peel strength of Examples 9 and 10 using the copolyetheresterimide adhesive is low, and the sample fails at relatively low peel strength.

The peel strength of the copolyetheresters of Examples 8 and 11 are substantially higher and acceptable, it being noted that the peel strength of the adhesive of Example 11 at 125° C. for 10 minutes is very good at the elevated temperature.

While other modifications of the invention and variations thereof which may be employed within the scope of the invention have not been described, the invention is intended to include such modifications as may be embraced within the following claims.

What is claimed is:

1. A flexible laminate comprising, in sequence, metal, a copolyetherester resin film and fabric.

2. The flexible laminate of claim 1 wherein the fabric comprises aromatic polyamide resin fibers in the form of a cloth.

3. The flexible laminate of claim 1 wherein the metal is about 0.1 mil to about 10 mils in thickness; the copolyetherester resin film is about 0.5 mil to about 50 mils in thickness; and the fabric is about 1 mil to about 50 mils in thickness.

4. The flexible laminate of claim 3 wherein the metal is about 0.5 mil to about 5 mils in thickness; the copolyetherester resin is about 5 mils to about 10 mils in thickness; and the fabric is about 2 mils to about 15 mils in thickness.

5. The flexible laminate of claim 1 wherein the metal is copper foil.

6. The flexible laminate of claim 1 wherein the metal is aluminum foil.

7. The flexible laminate of claim 1 wherein the metal is stainless steel foil.

8. The flexible laminate of claim 1 wherein the copolyetherester resin film is a random copolyetherester derived from the reaction products of butanediol, dimethylterephthalic acid, hexanediol and poly(tetramethylene ether)glycol.

9. The flexible laminate of claim 1 further comprising, in sequence, a thermoplastic encapsulant film on the flexible fabric.

10. The flexible laminate of claim 9 wherein the thermoplastic encapsulant film is about 0.5 mil to about 5 mils in thickness.

11. The flexible laminate of claim 9 wherein the encapsulant film is polyetheresterimide.

12. The flexible laminate of claim 9 wherein the encapsulant film is poly(butylene) terephthalate.

13. Articles made from the flexible laminate of claim 1.

14. A sanding belt substrate made from the flexible laminate of claim 1.

15. Articles made from the flexible laminate of claim 9.

16. A sanding belt substrate made from the flexible laminate of claim 9.

17. The use of copolyetherester resin as an adhesive in a laminate of metal and fabric comprising a copolyetherester resin in the form of a film between a surface of the metal and a surface of the fabric.

18. The use of copolyetherester resin as an adhesive as in claim 17 wherein the film of copolyetherester resin is a film cast on the surface of the fabric.

19. The use of copolyetherester resin as an adhesive as in claim 17 wherein the film of copolyetherester resin is a film cast on the surface of the metal.

20. The use of copolyetherester resin as an adhesive as in claim 17 wherein the film of copolyetherester resin is a random copolyetherester derived from the reaction products of butanediol, dimethylterephthalic acid, hexanediol and poly(tetramethylene ether)glycol.

21. The use of copolyetherester resin as an adhesive as in claim 20 wherein the metal is copper foil, aluminum foil or stainless steel foil, and the fabric is a cloth of aromatic polyamide resin fibers.

22. The use of copolyetherester resin as an adhesive as in claim 21 further comprising an encapsulant, moisture impermeable film on the surface of the fabric opposite the surface having the adhesive film of copolyetherester resin.

23. The use of copolyetherester resin as an adhesive as in claim 21 further comprising an encapsulant film of polyetherimide resin or poly(butylene terephthalate) resin on the surface of the fabric opposite the surface having the adhesive film of copolyetherester resin.

24. Articles prepared from the laminate of claim 17.

25. A sanding belt prepared from the laminate of claim 17.

26. A sanding belt prepared from the laminate of claim 21.

27. A sanding belt prepared from the laminate of claim 22.

28. A sanding belt prepared from the laminate of claim 23.

* * * * *